Dec. 30, 1969  TOSHIMASA SEKI ET AL  3,487,293
METHOD OF FIELD/FREQUENCY CONTROL DURING SAMPLE EXCHANGES
Filed April 21, 1967  2 Sheets-Sheet 1

INVENTORS
TOSHIMASA SEKI
BY MAKOTA TAKEUCHI

Webb, Burden, Robinson & Webb
THEIR ATTORNEYS

INVENTORS
TOSHIMASA SEKI
MAKOTA TAKEUCHI
BY
Webb, Burden, Robinson & Webb
THEIR ATTORNEYS

# United States Patent Office 3,487,293
Patented Dec. 30, 1969

3,487,293
METHOD OF FIELD/FREQUENCY CONTROL DURING SAMPLE EXCHANGES
Toshimasa Seki and Makota Takeuchi, Tokyo, Japan, assignors to Nihon Denshi Kabushiki Kaisha, Tokyo, Japan, a corporation of Japan
Filed Apr. 21, 1967, Ser. No. 632,814
Claims priority, application Japan, Apr. 23, 1966, 41/25,788
Int. Cl. G01r 33/08
U.S. Cl. 324—.5         5 Claims

ABSTRACT OF THE DISCLOSURE

A method of maintaining the field/frequency during sample exchanges of unknowns in gyromagnetic resonance production and measurement of unknown samples in which an auxiliary sample is utilized to keep the intensity of the polarizing magnetic field and the radio frequency a constant by either switching to the auxiliary sample or increasing the radio or audio frequency of said sample during the time the unknown sample is exchanged and using said auxiliary sample resonance characteristics to maintain field/frequency.

---

Our invention relates in general to a gyromagnetic resonance apparatus spectrometer and in particular to novel improved apparatus and methods for maintaining the stability of the apparatus during sample exchange.

Normally, the stability of gyromagnetic resonance apparatus is provided by a two sample type "field/frequency control" which maintains a constant ratio between the intensity of the magnetic field and the radio frequency; that is, it maintains the gyromagnetic resonance condition of a control sample located in a polarizing magnetic field independently of the sample to be measured, by utilizing the dispersion mode of the control sample.

Recently, however, a one sample "field/frequency control" has been developed utilizing the resonance signal of an internal reference sample added to the sample to be measured. This type of field/frequency control is especially useful in the 100 mc. hydrogen nucleus gyromagnetic resonance spectrometer in which the homogeneous region of the polarizing magnetic field is relatively narrow. The use of this type of control assures high stability and accurate measurement, since both the sample to be measured and the internal reference sample are unipositioned in the polarizing magnetic field, that is, in the same homogeneous region. This type of field/frequency control is generally considered superior to the two sample type because in the two sample type the instability caused by the difference in polarizing magnetic field between the two samples cannot be completely eliminated. Nevertheless, the one sample type has the disadvantage that during sample exchange the field/frequency control ceases to function and the intensity of the magnetic field tends to fluctuate. Consequently, the longer it takes to complete a specimen or sample exchange, the greater the drift of the magnetic field becomes from the resonance position. As a result, it requires a long time to reset the field/frequency control.

The present invention overcomes these difficulties and provides a novel method for stabilizing gyromagnetic resonance apparatus and production. Our invention provides a method for maintaining the stability of the spectrometer while the sample is being exchanged, and also to maintain the field/frequency control at the same time thereby eliminating the necessity of resetting the apparatus. Our invention also provides a method of changing from a field/frequency control based upon an internal reference control sample to an auxiliary control sample by changing the radio frequency/RF level so as to reach the optimum resonance condition for the internal reference sample or for the auxiliary sample by means of an attenuator. These and other features and advantages of our invention will become more apparent after perusing the following specification in conjunction with the accompanying drawings wherein:

Figure 1:
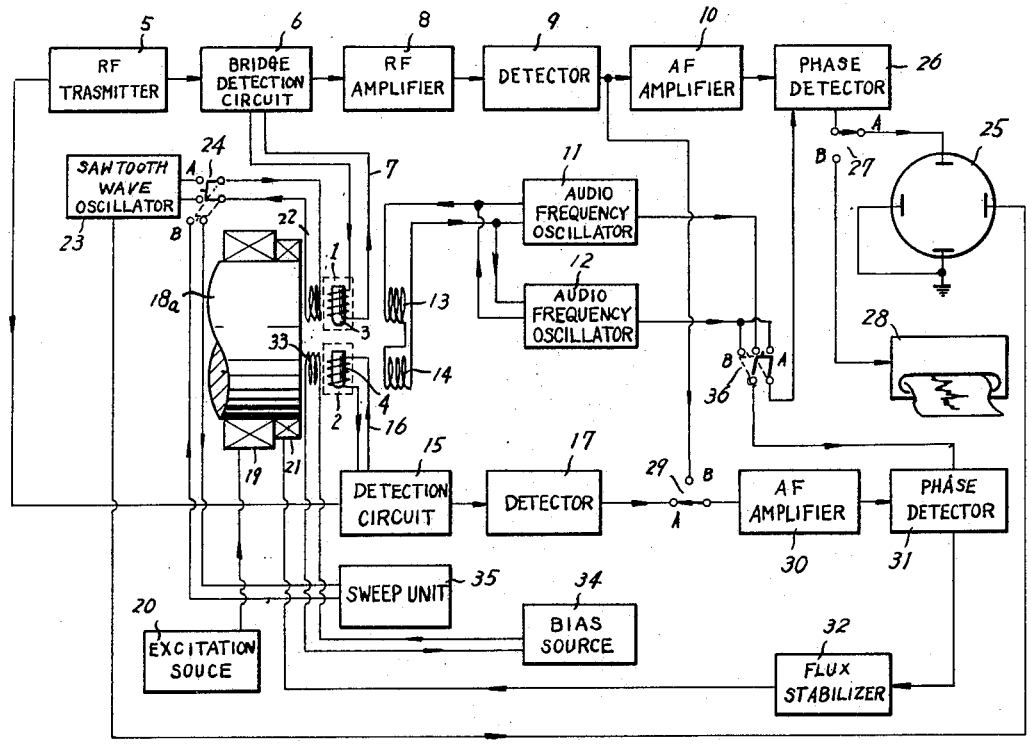
FIGURE 1 is a block schematic of the apparatus in accordance with the present invention.

Referring to FIGURE 1, sample probe 1 includes a tube 3 containing both the unknown substance or material and the internal reference sample. For the purposes of explaining our invention tetramethyl silane (TMS) has been utilized as the internal reference sample. Auxiliary sample probe 2 includes a tube 4 that contains a suitable known substance, for example, water. Water serves ideally as an auxiliary sample, and a small amount of paramagnetic material, such as $Cr^{++}$, may be added in order to reduce the relaxation time to around $10^{-3}$ seconds.

An RF transmitter 5 provides radio frequency currents for both the sample probe 1 and the auxiliary probe 2. The radio frequency output from the transmitter 5 is fed through a bridge detection circuit 6 to RF coil 7 located in sample probe 1 adjacent to and surrounding tube 3. RF coil 7 applies a radio frequency driving magnetic field to sample probe 1. At the same time, the output from the transmitter 5 is applied through detection circuit 15 to RF coil 16 located in the auxiliary probe 2 adjacent to and surrounding tube 4. RF coil 16 applies a radio frequency driving magnetic field to auxiliary sample probe 2.

The frequencies of the radio frequency currents applied to both RF coils 7 and 16 are the same and have been pre-adjusted to substantially the resonance frequency of the nuclei of the material or substance contained in tubes 3 and 4 at the desired operating field strength. A magnetic field created between the pole pieces 18a and 18b (not shown) of an electromagnet excited by the current flowing into coil 19 from excitation source 20 is applied to and passed through both the sample and auxiliary probes. The two probes are situated in the pole gap so as to prevent any interaction between the two samples.

In order to produce the respective resonance signals of the sample to be measured (the unknown), the internal reference sample, and the auxiliary sample, it is necessary to modulate the polarizing magnetic field by means of audio frequencies produced by two audio frequency oscillators 11 and 12, the outputs of which are applied to modulation coils 13 and 14 that are arranged co-axially with respect to the unidirectional magnetic field. The frequency of the output signal from oscillator 11 is constant, for example, $\omega_{mo}=4$ kc, and the frequency of the output signal from the oscillator 12 is variable. In other words, oscillator 12 constitutes a variable frequency oscillator, where the modulation frequency $\omega_{mv}$ equals $\omega_{mo}+\delta$, where $\delta$ is variable.

A coil 22 is utilized for superimposing a saw tooth wave field from a saw tooth wave oscillator 23 through switch 24 in order to indicate the resonance signals of the sample. The saw tooth wave oscillator is connected to the horizontal deflecting plates of an oscilloscope 25. By moving switch 24 to the B position (see FIGURE 1), coil 22, which is then energized by a sweep unit 35, is utilized for sweeping the magnetic field during sample measurement. When coil 22 is utilized to sweep the sample, the sweep unit is synchronized with audio frequency oscillator 12 and recorder 28. The resonance signals including the two frequency components $\omega_{mo}$ and $\omega_{mv}$ picked up by the RF coil 7 are fed into the RF amplifier 8 through bridge detection circuit 6. The output from RF amplifier 8 is then applied to detector 9 so that the radio frequency componets are cancelled out leaving only the audio frequency components which are fed into the phase detector 26 through AF amplifier 10. When phase detector 26 is connected to the audio frequency oscillator 12 through the switch 36, only the $\omega_{mv}$ component is detected, and fed to the vertical deflecting plates of the oscilloscope 25.

The bias coil 33 located adjacent to the auxiliary sample probe 4 in the polarizing magnetic field, is used for superimposing a bias field on the polarizing magnetic field. When the polarizing magnetic field H satisfies the condition of $H=(1/\gamma)(\omega_0 \pm n\omega_1)$, where $\gamma$ is the gyromagnetic ratio, $\omega_0$ is the angular frequency of the RF driving magnetic field, $\omega_1$ is the angular frequency of the audio magnetic field, and $n=0, 1, 2, \ldots$ gyromagnetic resonance of the auxiliary sample occurs and the resonance signal is detected by detector 17 through the bridge detection circuit 15, the audio output of which is fed into AF amplifier 30. The output from the AF amplifier 30 is applied to a phase detector 31. At the same time, the output from oscillator 11 is fed into the phase detector 31 through switch 36, as a reference signal. The resultant output signal of the phase detector 31 is then fed into a flux stabilizer 32 and fed back to a magnetic field correction coil 21 to correct the magnetic field fluctuation and to maintain the resonance condition of the auxiliary sample.

METHOD OF SAMPLE EXCHANGE

First, switches 24, 27, 29, and 36 are interlocked by positioning them at their respective A positions as shown in FIGURE 1. The resonance signals, including the side band signals produced by the magnetic field modulation, of the auxiliary sample are detected by the detection circuit 15 and, by filtering out the radio frequency components by means of the detector 17, the audio frequency components are fed into the phase detector 31 through switch 29 and AF amplifier 30. At this time, the output signal from the audio frequency oscillator 11 is applied through switch 36, to phase detector 31 as a reference signal. The output signal of the phase detector 31 is set at dispersion mode by changing the phase and is fed back to the magnetic field correction coil 21 through flux stabilizer 32. In other words, the field/frequency control is established by the auxiliary sample resonance signal, and the intensity of the polarizing magnetic field is locked to the resonant magnetic field $H_0$ of the auxiliary sample.

Figure 2:
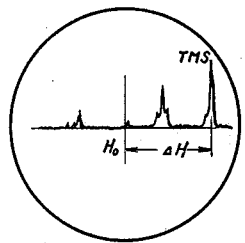
FIGURE 2 shows the resonance signals of the sample to be measured as observed on an oscilloscope when the interlocking switches are connected to the four terminals indicated by A in FIGURE 1.
Figure 3:
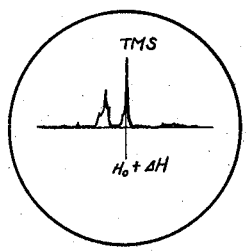
FIGURE 3 shows the resonance signals of the internal reference sample included in the sample to be measured which have been shifted to the center of the screen by changing the current from a bias source incorporated in the embodiment as shown in FIGURE 1.

The resonance signals of the sample or unknown to be observed, including side band signals, are detected by bridge detection circuit 6 and then fed into detector 9 through RF amplifier 8. Detector 9 passes only the audio frequency components which are then applied to AF amplifier 10, the output of which is applied to phase detector 26. The output signal from audio frequency oscillator 12 is applied through switch 36, to phase detector 26 as a reference signal so as to detect only components $\omega_{mv}$ of the output signal from the detector 9. The output signal of the phase detector 26 is then fed through switch 27 into the vertical deflecting plates of oscilloscope 25 to indicate the resonance signal. The output signal of phase detector 26 is adjusted for absorption mode by adjusting the phase of the reference signal from audio frequency oscillator 12. The absorption mode of the sample observed at the screen is shown in FIGURE 2. In this case, the resonance signal of the internal reference sample appears some distance from the screen center because the polarizing magnetic field is locked to the resonant field $H_0$ of the auxiliary sample. Also, since tetramethyl silane (TMS) is used as the internal reference sample, the spectrum line, which is very sharp, appears at the highest side of the magnetic field, that is, on the right side of the screen as shown in FIGURE 2. In order to move the spectrum line to the center, the bias current of bias source 34 must be adjusted. In other words, when there exists a difference $+\Delta H$ between the center field $H_0$ of the polarizing magnetic field and the resonance field of the internal reference sample, adjustment is necessary to increase the center field $H_0$ by the amount of $\Delta H$. The adjustment is accomplished by applying a field $-\Delta H$ to the auxiliary sample, without affecting the field controlling sample or unknown, to be measured, by bias coil 33. The resultant output signal from phase detector 31 is fed to stabilizer 32 which is then fed to correction coil 21 to produce the magnetic field $\Delta H$ and compensate for the bias field $-\Delta H$. By doing this, the center of the polarizing magnetic field for the sample to be observed becomes $H_0+\Delta H$ resulting in the resonance TMS signal being moved to the center of the screen as shown in FIGURE 3.

To measure the sample or unknown, switches 24, 27, 29, and 36 must be switched to their terminal points B (see FIGURE 1). At this time, the frequency driving system of the audio frequency oscillator 12 and the magnetic field sweeping system of the sweep unit 35 are simultaneously driven and synchronized with the pen recording mechanism of recorder 28. The resonance signal of the sample picked up by the RF coil 7 is detected by the bridge detection circuit 6 and fed into detector 9 in which only the audio frequency components are detected after being amplified by the RF amplifier 8. The output signal of the detector 9 is split and fed into both the AF amplifiers 10 and 30 and then applied to both the phase detectors 26 and 31 respectively. At the same time, the output from oscillator 12 is applied to the phase detector 31 as a reference signal, and the output from oscillator 11 is also applied to the phase detector 26 as a reference signal. The phase detector 26 detects only the $\omega_{mo}$ component of the resonance signal which is recorded on the recorder 28. The phase detector 31 detects only the $\omega_{mv}$ component of the resonance signal which is fed back to the flux stabilizer 32 so as to maintain the resonance condition of the TMS signal and maintain the ratio between the resultant polarizing magnetic field ($H_0 \pm \Delta H$) and the radio frequency a constant. Since the magnetic field is swept synchronously with the audio frequency sweep and the recorder pen sweep while the field/frequency ratio is being kept constant, the signal can be accurately recorded.

Prior to sample exchange, the recorder pen must be returned to its orignal position, and the audio frequency $\omega_{mv}$ from the frequency oscillator 12 must be reset to $\omega_{mo}$. In other words, the local polarizing magnetic field for the internal reference sample must be reset to $$H_0+\Delta H$$

and the local polarizing magnetic field for the auxiliary sample to $H_0$. The switches 24, 27, 29, and 36 are to be switched over to the terminals A as shown in FIGURE 1. By doing this, the field/frequency control is changed from internal reference sample control to auxiliary sample control and the polarizing magnetic field is locked to the field $H_o$. Even though it takes a long time to substitute the new sample, the field/frequency control can rapidly be changed from auxiliary sample control to internal reference sample control by simply throwing switches 24, 27, 29, and 36 to terminals B. This is due to the fact that the magnetic field has been kept at $H_o + \Delta H$.

Figure 4:
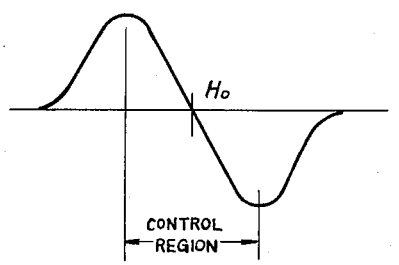
FIGURE 4 shows the dispersion mode of the auxiliary sample.
Figure 5:
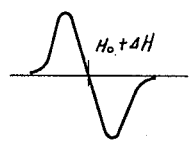
FIGURE 5 shows the dispersion mode of the internal reference sample obtained by using the present invention.

FIGURE 4 shows the dispersion mode of the resonance signal of the auxiliary sample, for example, water that includes paramagnetic ion $Cr^{++}$, and FIGURE 5 shows the dispersion mode of the proton included in the internal reference sample $Si(CH_3)_4$ (TMS), the scale of the field intensity being identical to that of FIGURE 4. As is apparent from these two figures, the control region of the auxiliary sample is much wider than that of the internal reference sample. Therefore, if the magnetic field to be controlled exists within the control region in FIGURE 4, it is possible to lock the field to $H_o$.

Figure 6:
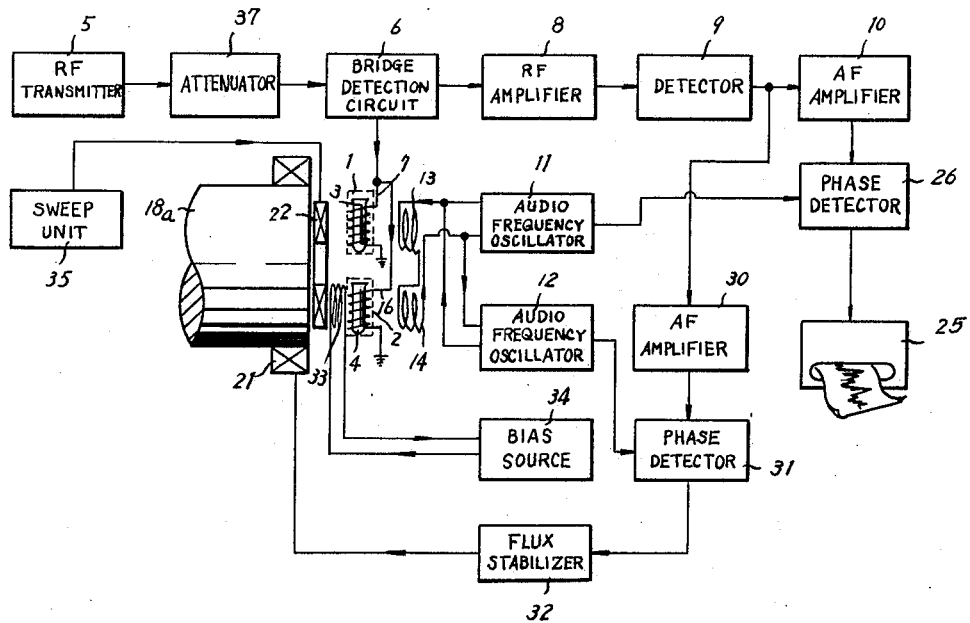
FIGURE 6 is an alternative schematic diagram of a novel gyromagnetic resonance spectrometer wherein the field/frequency control is applied from the internal reference sample control to the auxiliary sample control by changing the RF level of the RF transmitter.

FIGURE 6, which utilizes the same component units as FIGURE 1, shows an alternative arrangement in respect to the present invention wherein changing the RF level so as to saturate the resonance signal of the internal reference sample, the field/frequency control can be changed from internal reference sample control to auxiliary sample control. This is made possible by virtue of the fact that the ratio between the products of $T_1$ and $T_2$ of the internal reference sample $Si(CH_3)_4$ and the products of $T_1$ and $T_2$ of the auxiliary sample (water including $Cr^{++}$), where $T_1$ is the spin-lattice relaxation time and $T_2$ is the spin-spin relaxation time, is in the order of 10:1. That is, when observing the sample, the RF level is made small so that the resonance of the sample and the internal reference sample reaches the optimum condition. On the other hand, when the sample is being exchanged, the RF level is made high so that the resonance of the auxiliary sample reaches the optimum condition. Therefore, by changing the RF level, it is possible to change the field/frequency control from internal reference sample control to auxiliary sample control, and vice versa.

In this embodiment, an RF coil 7, located in sample probe 2 adjacent to and surrounding tube 3, is connected to an RF coil 16 in parallel. At this time, the units 15 and 17 which are used to detect the resonance signal of the auxiliary sample in the embodiment of FIGURE 1 are substituted for by units 6 and 8. An attenuator 37 is arranged between the RF transmitter 5 and bridge detection circuit 6 and is provided so that the range of the RF magnetic field can be varied around 80 db in order to adjust for the effective RF level ($H_{eff}$). The sweep field produced by the coil 22 is now applied to both sample probes 1 and 2.

Figure 7:
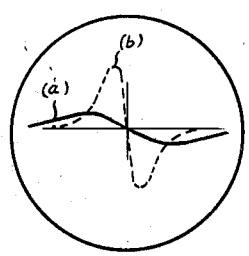
FIGURE 7 shows the resonance signals of the sample to be measured when the RF level is extremely high.

The attenuator 37 is adjusted so as to apply a strong RF level to both the sample and the auxiliary sample. This effective RF level is at an optimum condition for the auxiliary sample. At this time, the resonance signal (see FIGURE 7(a)) of the internal reference sample is much smaller than that of the auxiliary sample due to saturation.

The resonance signals including the two audio frequency components $\omega_{mo}$ and $\omega_{mv}$, are amplified by the RF amplifier 8 through bridge detection circuit 6 and then fed into detector 9. The only output signals of detector 9 are the audio frequency components. These two audio frequency components are fed into both phase detectors 26 and 31 respectively. The output signals of audio frequency oscillators 11 and 12 are applied to phase detectors 26 and 31 respectively as reference signals. The $\omega_{mo}$ component is detected by phase detector 26 and is indicated on recorder 25. The $\omega_{mv}$ component is detected by phase detector 31 and applied to flux stabilizer 32. The output signal of flux stabilizer 32 is fed into a magnetic field correction coil 21 to lock the polarizing magnetic field to the resonance field $H_o$ of the auxiliary sample.

When measuring the sample, the attenuation of the attenuator 36 is increased gradually up to 60 db, that is, the effective RF level is decreased. Finally, the RF level must be reset to about 1/1000 (one thousandth) of the above mentioned strong RF level. As a result, the resonance signal (see FIGURE 7(b)) of the internal reference sample increases gradually and finally reaches a point where it becomes about 30 times larger than that of signal (a) in FIGURE 7. On the other hand, the signal of the auxiliary sample decreases gradually.

The frequency driving system of audio frequency oscillator 12 and the field driving system of the sweep unit 35 are simultaneously driven and synchronized with the pen recording mechanism of recorder 25.

The resonance signal produced in RF coil 7 is amplified by the RF amplifier 8 through the bridge detection circuit 6 and is fed into the detector 9 where only the audio frequency components are selected. The output from the detector 9 is split and fed into both the phase detectors 26 and 31 through AF amplifiers 10 and 30. At the same time, outputs from oscillators 11 and 12 are respectively fed into the phase detectors as reference signals. Detector 26 detects only the $\omega_{mo}$ audio frequency component which is indicated on the recorder 25. The output signal of the detector 31 is fed back to the magnetic field correction coil 21 through flux stabilizer 32.

Prior to sample exchange, the RF level must be reset to the original value, i.e., at the high intensity level, so as to increase the resonance signal of the auxiliary sample and decrease that of the internal reference sample so that the reference signal of the auxiliary sample increases and that of the internal reference sample decreases. Consequently, the field/frequency control is applied by the auxiliary sample signal and the sample to be observed can be taken out without any field fluctuation. As described heretofore, the field/frequency control is changed from internal reference sample control to auxiliary sample control by changing the RF level. On the other hand, when changing the output level of audio frequency oscillator 11 or 12 without changing the RF level of the RF transmitter, the same effect can be obtained.

Although the present invention has been shown and described as it is utilized with a magnetic field sweep type gyromagnetic resonance apparatus, other types of gyromagnetic resonance apparatus, for example, the frequency sweep type apparatus and the apparatus for the side band wave system utilizing the radio frequency modulation method may be utilized with the present invention.

We claim:
1. A method of field/frequency control during sample exchange of unknowns in the production and measurement of gyromagnetic resonance in unknown samples in which a first sample having added thereto a known internal reference sample for field/frequency control is positioned in a polarizing magnetic field, said sample is subjected to a radio frequency magnetic field normal to said polarizing magnetic field, the improvement comprising:
  (A) positioning an auxiliary sample having a shorter relaxation time than said internal reference sample in the polarizing field;
  (B) subjecting the auxiliary sample to said radio frequency magnetic field.
  (C) causing said first sample and said internal reference sample to resonate by causing the radio frequency level of said radio frequency field to be small and to thereby cause said auxiliary sample not to resonate;
  (D) sweeping the polarizing magnetic field by superimposing upon said field a second magnetic field and maintaining during said sweep the ratio between said polarizing magnetic field and said radio frequency a constant by detecting fluctuations in the resonance signals of said internal reference sample and applying a correction dependent on said fluctua- tions to said polarizing magnetic field to maintain said ratio;

(E) detecting the signals from said first sample when swept through said second magnetic field and recording same;

(F) exchanging said first sample with a second sample having added thereto the same internal reference sample while causing only said auxiliary sample to resonate by saturating said internal reference resonance signals by increasing the radio frequency level of said radio frequency field, detecting fluctuations of said resonance signals from said auxiliary sample and applying a correction dependent on said fluctuations to said polarizing magnetic field to maintain the ratio between said field and said radio frequency a constant to thereby permit the exchange of samples without causing the polarizing magnetic field to fluctuate;

(G) repeating steps C, D and E for a second sample; and (H) repeating step F for succeeding samples having added thereto the same internal reference sample and with each succeeding sample repeating steps C, D and E.

2. The improvement claimed in claim 1 wherein said polarizing magnetic field is modulated by superimposing thereon an audio frequency magnetic field to cause side band resonances in said first and succeeding samples and said internal reference sample when said samples are swept to cause resonance in said first and succeeding samples by said second magnetic field.

3. The improvement claimed in claim 1 wherein the ratio of the products of the spin-lattice relaxation time and the spin-spin relaxation time between internal reference sample and the auxiliary sample is at least ten to one.

4. The improvement claimed in claim 2 wherein said modulation comprises superimposing an audio frequency magnetic field having two components, one of said components being constant, the other of said components being variable, said variable component comprising a part of said resonance signal of said internal reference sample when said sample is resonating and comprises a component of said resonance signal of said auxiliary signal when said sample is resonating and where said component comprises the fluctuations that are applied to said polarizing magnetic field to maintain said ratio between said field and the radio frequency.

5. The improvement claimed in claim 3 wherein said internal reference sample comprises tetramethyl silane and said auxiliary sample comprise water having added thereto an amount of paramagnetic material sufficient to cause the relaxation time thereof to be reduced to about $10^{-3}$ seconds.

References Cited

UNITED STATES PATENTS 3,388,322    6/1968    Anderson _____ 324—.5

RUDOLPH V. ROLINEC, Primary Examiner

M. J. LYNCH, Assistant Examiner